United States Patent
Taniel (10) Patent No.: US 9,890,742 B2
(45) Date of Patent: Feb. 13, 2018

(54) METHOD AND DEVICE FOR OPERATING A DIESEL ENGINE WITH EMULSION FUELS OF VARIABLE COMPOSITION

(71) Applicant: Roman Taniel, Pronstorf (DE)

(72) Inventor: Roman Taniel, Pronstorf (DE)

( * ) Notice: Subject to any disclaimer, the term of this patent is extended or adjusted under 35 U.S.C. 154(b) by 41 days.

(21) Appl. No.: 14/771,443

(22) PCT Filed: Feb. 20, 2014

(86) PCT No.: PCT/EP2014/000450
§ 371 (c)(1),
(2) Date: Aug. 28, 2015

(87) PCT Pub. No.: WO2014/131498
PCT Pub. Date: Sep. 4, 2014

(65) Prior Publication Data
US 2016/0010593 A1    Jan. 14, 2016

(30) Foreign Application Priority Data

Mar. 1, 2013 (DE) .......... 10 2013 003 382
Aug. 9, 2013 (EP) .................... 13003990
Sep. 5, 2013 (EP) .................... 13004358

(51) Int. Cl.
*F02M 25/022* (2006.01)
*F02D 41/00* (2006.01)
(Continued)

(52) U.S. Cl.
CPC ....... *F02M 25/0228* (2013.01); *F02D 19/082* (2013.01); *F02D 41/0025* (2013.01);
(Continued)

(58) Field of Classification Search
CPC ......... F02B 47/02; F02B 3/06; F02M 25/022; F02M 25/0228; F02M 25/025
(Continued)

(56) References Cited

U.S. PATENT DOCUMENTS 4,898,140 A * 2/1990 Pages .................... F02D 33/006
123/510
6,390,149 B1 * 5/2002 Arbey .................. F01M 11/045
141/27
(Continued)

FOREIGN PATENT DOCUMENTS

DE         4412965      10/1995
DE      102005044046    1/2007
(Continued)

OTHER PUBLICATIONS

Aktuell Forschung "Ruβ- und NO$_x$-Reduktion dank Dieselkraftstoff-Weser-Mikroemulsion" Universität Köln / Fachhochschule Trier; MTZ Jun. 2005 Jahrgang 66.
(Continued)

*Primary Examiner* — Jacob Amick
*Assistant Examiner* — Charles Brauch
(74) *Attorney, Agent, or Firm* — Jason H. Vick; Sheridan Ross, PC (57) ABSTRACT

The invention proposes a method and an emulsifying apparatus for the operation of a diesel engine with a water-diesel fuel emulsion, wherein the water fraction is varied as a function of the engine operating point and/or the emulsifying apparatus and/or parts of the injection line are flushed with pure diesel fuel upon a shutdown of the engine.

26 Claims, 5 Drawing Sheets

(51) Int. Cl.
  *F02D 41/04* (2006.01)
  *F02D 19/08* (2006.01)
  *F02M 25/025* (2006.01)
  *F02B 3/06* (2006.01)
  *F02B 47/02* (2006.01)
  *F02D 41/38* (2006.01)

(52) U.S. Cl.
  CPC .............. *F02D 41/042* (2013.01); *F02B 3/06* (2013.01); *F02B 47/02* (2013.01); *F02D 2041/389* (2013.01); *F02M 25/022* (2013.01); *F02M 25/025* (2013.01)

(58) Field of Classification Search
  USPC ........................................................ 123/25 E
  See application file for complete search history.

(56) References Cited

U.S. PATENT DOCUMENTS

| | | | | |
|---|---|---|---|---|
| 6,755,703 | B1* | 6/2004 | Erickson | B63H 21/213 440/75 |
| 2007/0056534 | A1 | 3/2007 | Verstallen | |
| 2008/0098885 | A1* | 5/2008 | Hall | F16J 1/008 92/172 |
| 2010/0024771 | A1* | 2/2010 | Bidner | F02D 19/0605 123/446 |
| 2011/0108638 | A1* | 5/2011 | Roehner | F16K 15/025 239/533.2 |
| 2011/0264358 | A1* | 10/2011 | Nishida | F02D 19/082 701/104 |
| 2011/0290492 | A1* | 12/2011 | Hodgson | B01F 3/0807 166/305.1 |
| 2012/0180741 | A1 | 7/2012 | Strey et al. | |

FOREIGN PATENT DOCUMENTS

| | | |
|---|---|---|
| DE | 102009048223 | 6/2011 |
| EP | 2372133 | 10/2011 |
| JP | 2002221101 A * | 8/2002 |
| JP | 2002221101 A * | 8/2002 |
| JP | 2007146669 A * | 6/2007 |

OTHER PUBLICATIONS

Bach, Florian, et al. "Einfluss von Diesel-EthanolWasser emulsionskraftstoffen auf die Dieselmotor-Emissionen [Influence of diesel-ethanol-water emulsion fuels on diesel engine emissions]" MTZ May 2011. pp. 408-414.

Pittermann, Roland et al, "Einfluss von Abgasrückführung Lind Kraftstoff-Wasser-Emulsion auf Verbrennungsablauf und Schadstoffbildung im Dieselmotor [Influence of exhaust gas recirculation and fuel-water emulsion on combustion process and pollutant formation in the diesel engine]. MTZ 60(1999)12, pp. 812-818".

International Search Report (Including Translation) for International Application No. PCT/EP2014/000450, dated Apr. 11, 2014.

Written Opinion (Including Translation) for International Application No. PCT/EP2014/000450, dated Apr. 11, 2014.

* cited by examiner

METHOD AND DEVICE FOR OPERATING A DIESEL ENGINE WITH EMULSION FUELS OF VARIABLE COMPOSITION

CROSS REFERENCE TO RELATED APPLICATIONS

This application is a national stage application under 35 U.S.C. 371 of PCT Application No. PCT/EP2014/000450 having an international filing date of 20 Feb. 2014, which designated the United States, which PCT application claimed the benefit of German Application No. 10 2013 003 382.9 filed 1 Mar. 2013, European Application No. 13 003 990.2, filed 9 Aug. 2013, and European Application No. 13 004 358.1, filed 5 Sep. 2013, each of which are incorporated herein by reference in their entirety.

The invention relates to a method for operating a combustion engine with a water-in-diesel fuel emulsion. The present invention further relates to a device for producing a water-in-diesel fuel emulsion for a diesel engine as well as to a diesel engine provided therewith.

BACKGROUND OF THE INVENTION

Diesel engine combustion is characterized by the injection of a self-ignitable fuel under very high pressure through an injector nozzle into a combustion bowl arranged in the piston. After the atomization and vaporization of the fuel in the combustion air heated to high temperatures through compression, a mixing of the already vaporized fuel components with the combustion air takes place. This carburetion is achieved on the one hand through the distribution of the fuel by means of 6- to 8-hole injector nozzles, and on the other hand through swirling air generated in the inlet channels. The chemical processing of the fuel-air mixture then occurs through cracking of the relatively long fuel molecules and the formation of active radicals. If the concentration of active radicals is sufficiently high, the self-ignition of the fuel-air mixture begins in the form of a chain reaction. The time required for the physical and chemical carburetion processes is referred to as the ignition delay. Due to the short amount of time available for carburetion as a result of the direct injection of the fuel, the remaining combustion takes place in a fuel-air mixture with locally non-homogenous fuel distribution. The ignition phase of this "non-homogenous" fuel-air mixture is characterized by the occurrence of "ignition cores" in already ignitable regions of the mixture. As combustion continues, the fuel droplets react first that have reached the compressed hot combustion air at the beginning of the injection of fuel and for which a relatively long time is thus available for mixture processing. Due to the resulting relatively faster combustion reactions, this combustion phase, which is also referred to as the combustion of "pre-mixed" mixture, is characterized by higher combustion temperatures and thus greater thermal nitrogen oxide formation and less soot formation. However, during this first combustion phase, only a certain portion of the fuel-air mixture determined by the length of the ignition delay is combusted. The remaining mixture quantity that is not yet ignitable at the moment of the start of combustion and depends on the required engine load, is first processed as the combustion process continues through steeply rising gas temperatures and an intensive charge motion and then combusts in part under lack of air at a relatively low rate of combustion. This combustion phase, which is also called "diffusion-controlled" combustion, is characterized by initial soot formation occurring as a result of local air deficiency and subsequent incomplete post-oxidation of soot with simultaneously reduced nitrogen oxide formation.

The various phases of the combustion process and the corresponding mechanisms of pollutant formation yield a relationship between the nitrogen oxide and soot emissions that is typical of diesel engine combustion and is also referred to as NOx particle trade-off. This NOx particle interrelation means that, if the engine operation parameters (e.g., the injection timing) are adjusted for low NOx emissions, a simultaneous rise in soot/particle emissions is unavoidable.

In order to comply with the legally prescribed pollutant emissions of diesel engines, measures are taken both within the engine and externally in the form of exhaust gas treatment processes. The most important of the measures taken within the engine to improve the fuel-air mixture formation consists in the use of high-pressure injection systems, which enable injection pressures of greater than 200 MPa. The improved breakdown of the injection spray into smaller fuel droplets achieved in this way leads to improved mixing of the fuel with the combustion air and thus to fewer rich mixture zones and, accordingly, to substantially lower soot and particle emissions. Due to the higher combustion temperatures, the carburetion intensified in this way results in higher NOx emissions, which are to be avoided through increased excess air by means of increased charge pressures and optimized injection quantity curves. Another measure is exhaust gas recirculation (EGR), which is increasingly also being used in heavy commercial vehicle engines. However, the exhaust gas return rate and thus also the possible NOx reduction through decreasing oxygen content in the combustion air are limited once again by rising soot and particle emissions.

Since the described measures taken within the engine to reduce pollutants are insufficient for bringing emissions to below the exhaust gas limits, DeNOX catalytic converser systems with urea as a reduction agent and, separately from diesel engines, particle filter systems that are known for use in passenger vehicles are being used in newly approved commercial vehicle engines that must meet the requirements of Euro 5 and Euro 6 pollutant categories. To achieve the emissions goals, the raw emission behavior of the diesel engine must be adapted to the exhaust gas treatment systems used. For instance, in typical Euro 5 diesel engines, the particle emissions are reduced to the corresponding limits through flexibly tunable Common Rail (CR) injection systems with 160 to 180 MPa injection pressure, whereas the nitrogen oxide emissions are usually reduced sufficiently through the use of a urea-based DeNOx system. Sometimes, the NOx emissions are also reduced through a combination of exhaust gas recirculation and downstream DeNOx system. Which economically tenable combination of methods is used depends essentially on the raw emissions of a diesel engine. In diesel engines of the Euro 6 emissions level, the use of additional optimized injection systems with injection pressures from 200 MPa and up are required in order to further reduce particle emissions, as well as more efficient EGR-DeNOx system combinations. In particular, the use of EGR systems with substantially higher EGR rates and of DeNOx systems with NOx conversion rates of up to 90 percent is necessary. If the NOx emission limits cannot be complied with through the described use of EGR and DENOx systems, the additional use of a particle filter system with commensurately adapted tuning of the EGR and DeNOx system is unavoidable.

It must therefore be noted that the Euro 5 and especially Euro 6 emissions levels applicable to heavy commercial vehicle engines can only be achieved with considerable additional technical and economic expenditure. Due to catalytic converter-related increased exhaust gas back pressure and the adaptations of the combustion process that may be required, a degradation of the fuel consumption performance can be expected for all combinations of methods for reducing NOx and particle emissions. What is being sought here in principle, however, are NOx particle emissions from the engine that are as low as possible, since that reduces the effort required on the part of exhaust gas treatment.

Besides measures taken on the interior of the engine and the use of exhaust gas treatment systems, composition-modified fuels also represent an attractive possibility, in principle, for reducing harmful emissions in diesel engines. Special interest has long existed in the addition of water and other components, such as alcohol, to diesel fuel, since the nitrogen oxide-soot trade-off can be favorably influenced in this way, cf. Bach, F., Luft, M., Bartosch, S., Spicher, U.: *Einfluss von Diesel-Ethanol-Wasser-Emulsionskraftstoffen auf die Dieselmotor-Emmissionen* [Influence of diesel-ethanol-water emulsion fuels on diesel engine emissions]. MTZ 05/2011, pp. 408-414.

When using water-in-diesel fuel emulsion, either a ready-to-use water-diesel emulsion is injected into the combustion chamber instead of pure diesel fuel while using an emulsifying additive or an emulsion produced on board the vehicle by the existing injection system. The production of the emulsion in the vehicle has the advantage that the water fraction in the mixed fuel can be selected relatively freely in consideration of the technical limits of combustion with regard to the maximum reduction of pollutants.

In principle, besides the use of water-in-diesel fuel emulsions, it is also possible to exploit the advantageous characteristics of water to reduce combustion temperatures through the injection of water into the intake air and the direct injection of the water into the combustion chamber. Due to the high enthalpy of vaporization of the water, when it is added through the intake pipe and especially when it is injected directly, substantial cooling of the intake air or combustion air is achieved in the cylinder and thus also a reduction in nitrogen oxide emissions of up to 50 percent. Due to the relatively little mixing of the diesel fuel with water in the combustion chamber and the resulting lesser homogenization of the diesel fuel in the combustion chamber in comparison to emulsion fuels, however, the reduction of the soot emissions ends up being less; cf. DE 10 2009 048 223 A1. Emulsion fuels therefore offer, in addition to easier use in series engines, greater potential for reducing the critical harmful components in the exhaust gas of diesel engines.

Water-diesel emulsions can be regarded as disperse multiphase systems of at least two liquids insoluble in a mixture in which water is regarded as the inner, disperse phase. Accordingly, diesel fuel represents the outer phase, the dispersant. Water-diesel emulsions are not thermodynamically stable and separate after a relatively short standing time. Through the use of emulsifying additives, so-called emulsifiers, it is possible, in principle, to convert a water-diesel emulsion into a thermodynamically stable form. One criterion that is important for the suitability of an emulsion as fuel for diesel engines is that the water droplets be distributed as finely as possible in the diesel fuel. Emulsions produced in the vehicle using an emulsifier or, if no emulsifier is used, using an appropriate mixing device are suitable for mobile use. Emulsions produced outside of the vehicle, such as those available at gas stations, for example, have a constant composition that is not adapted to the requirements of the engine operation and therefore does not achieve full potential in terms of the reduction of emissions and consumption.

The effect of water-diesel emulsions consists, on the one hand, in a temperature reduction occurring during the water vaporization and, on the other hand, in reduced combustion temperatures as a result of the increased inert gas fraction in the form of water vapor. Both lead to a lengthening of the physical ignition delay, which leads to a more uniform (homogeneous) distribution of the fuel in the combustion chamber and thus to a greater proportion of "pre-mixed" combustion. The resulting intensified homogenization of the mixture in conjunction with the water droplets being finely distributed in the emulsion leads to a reduction of highly fuel-rich regions of the mixture, which are substantially responsible for the occurrence of soot during the combustion process. The reduction of the nitrogen oxide emissions can be attributed to a significant flame temperature reduction both as a result of the high enthalpy of vaporization of the water and the water-related lower local specific heat release in the combustion zone; cf. Pittermann, R., Hinz, M., Kauert, L: *Einfluss von Abgasrückführung und Kraftstoff-Wasser-Emulsion auf Verbrennungsablauf und Schadstoffbildung im Dieselmotor* [Influence of exhaust gas recirculation and fuel-water emulsion on combustion process and pollutant formation in the diesel engine]. MTZ 60(1999)12, pp. 812-818. The frequently used exhaust gas recirculation (EGR) for reducing the NOx emissions also brings about lower flame temperatures in accordance with the increased inert gas fraction. However, increased soot emissions occur at higher EGR rates, which can be avoided in the combination with water-diesel emulsion fuels. The use of water-diesel emulsion fuels thus increases EGR tolerance and hence the potential for reducing NOx and soot.

Another requirement for the optimal use of an emulsion fuel is the need to adapt the water fraction in the emulsion to different engine operating states, and to engine shutdown and startup even after extended non-operation.

In the starting phase of the diesel engine, reliable and quick startup and quick heating of the engine can only be achieved in pure diesel fuel operation, since stable combustion is already achieved after several stroke cycles. When using a water-diesel emulsion in the starting phase as well, the number of stroke cycles without combustion increases as a result of the worsened self-ignitability of the emulsion, with commensurately increased emissions of uncombusted fuel. As the engine warms up, the water fraction in the emulsion can be increased in the warm-up phase.

In the case of predominantly stationary engine operation and high output, a greater proportion of water can be contained in the emulsion due to the higher combustion chamber temperatures in order to thus achieve a combustion process that is as efficient as possible along with simultaneously high reduction of NOx and particle emissions. In low load states and commensurately low combustion chamber temperatures, a reduction of the water fraction in the emulsion is necessary in order to prevent excessive cooling of the flame zones and the associated emissions of uncombusted fuel. Predominantly stationary engine operation with only relatively slow changes in load and engine speed does not require dynamic emulsifying systems.

In principle, the use of the full potential of a water-diesel emulsion in terms of reduced NOx and soot is only possible if the water fraction is as close as possible to the respective technical combustion limit, as a function of the operating point. For the dynamic operation that usually occurs with automobiles, this means that it is absolutely necessary to have a very quick adaptation of the water fraction to the momentary combustion chamber temperatures and to the oxygen content available for combustion while making use of exhaust gas recirculation. The quicker the adaptation of the water fraction to the momentary operating state of the engine, the greater the reduction in emissions. This is all the more important given that the determination of the emissions behavior of diesel engines is done for commercial vehicles and mobile working machines using transient exhaust gas test cycles.

PRIOR ART

A method for producing a microemulsion is described in DE 10 2009 048 223 A1 in which diesel fuel and water are separated by means of two common rail injection systems and fed under high pressure to a mixing chamber arranged between the high-pressure rails for diesel and water and the injector nozzle. It is in this mixing chamber that a microemulsion is formed with the emulsifier already contained in the diesel fuel. This arrangement of the relatively small mixing chamber at a short distance in front of the injector and the thereby enabled small mixing chamber and injection line volumes is intended to enable a quick adaptation of the water fraction in the emulsion fed into the injector to the operating point of the diesel engine in only a few stroke cycles. This method requires the use of special emulsifiers that enable very fast water-diesel emulsion formation.

A device is known from DE 10 2005 044 046 B4 that feeds water and diesel fuel by means of a mechanically or hydraulically driven stepped piston at a pressure of up to 200 MPa to a counterflow high-pressure emulsifying nozzle. The water-diesel emulsion produced is held available in several spring-loaded intermediate reservoirs, which also have a damper function, and conducted via a distribution pipe to the injectors as needed. In principle, this device therefore represents a combined emulsifying and high-pressure pump that is comparable to the diesel high-pressure pump of a conventional common rail injection system. The relatively large fuel rail volumes in the high-pressure pump and in the distribution line to the injectors do not permit quick adaptation of the emulsion composition within a few stroke cycles. Particularly the pure diesel operation or operation with small water fractions required during engine startup and warm-up phase requires an appropriate pre-storage of the fuel, for example in connection with a flushing device for the high-pressure distribution line and the injection lines, which is not provided for in the published device.

Another problem is the danger of coalescence as a result of a relatively long dwell time of the emulsion in the rails and injection lines, particularly at low engine load, and the associated phase separation of the water-diesel emulsion.

A method and a device for controlling the diesel fuel and water-diesel emulsions supply in in-line injection pumps is known from DE 44 12 965 A1 in which, depending on the load state of the engine, differently composed emulsions are generated in a mixing system and then fed to the injection pump, or there is exclusive diesel operation. To reduce the reaction time between the production of an altered emulsion and the injection of this emulsion, the so-called low-pressure pump chamber is flushed appropriately according to the desired increase or reduction of the water fraction in the emulsion from an emulsion or diesel rail. In addition, a switch from emulsion operation to pure diesel operation as a function of the operating mode is presented. In particular, the engine is to be operated with pure diesel fuel when in idle, while emulsion operation is used under greater loads.

The effect of this dead time between the emulsion formation and provision thereof at the injector on the operation and emissions behavior depends substantially on the system volume in the area of emulsion production and the fuel volume to be exchanged in the high-pressure region of the injection system. In any case, adaptation to dynamic operating conditions occurs relatively slowly.

None of the methods and devices presented above offers a solution for the flushing of the entire high-pressure region of the injection devices with diesel fuel after engine shutdown in order to avoid ignition and hence emissions problems when the engine is started up again or to prevent corrosion and/or wear that might occur in the injection system.

PROBLEM

It is the object of the present invention to provide a method and a device for operating a diesel engine with a diesel fuel-water emulsion produced in the vehicle having a dynamically changeable load- and speed-dependent water fraction.

INVENTIVE SOLUTION OF THE PROBLEM

The above object is achieved by a method according to claim 1 or a device according to claim 8. Advantageous developments are the subject matter of the subclaims.

In particular, the invention comprises the production of a fuel-water mixture, especially preferably a water-in-diesel fuel emulsion, by a mechanical emulsifying device preferably arranged in the high-pressure part of an injection system and/or between a fuel rail and an injector nozzle and/or an injection valve or injector.

The invention further relates to a mixing device suitable for the arrangement for the mixing-in of water in the high-pressure part of a common rail-fuel injection system with hydraulically driven high-pressure emulsifying system, in which the separately fed-in media diesel fuel and water are first mixed in a mechanical pre-mixer and then fed to an internal recirculation circle or recirculation loop in order to in order to produce a sufficiently homogeneous and stabile water-diesel emulsion.

The emulsion is preferably produced—particularly by a mechanical emulsifying device without the use of emulsifiers.

Figure 1:
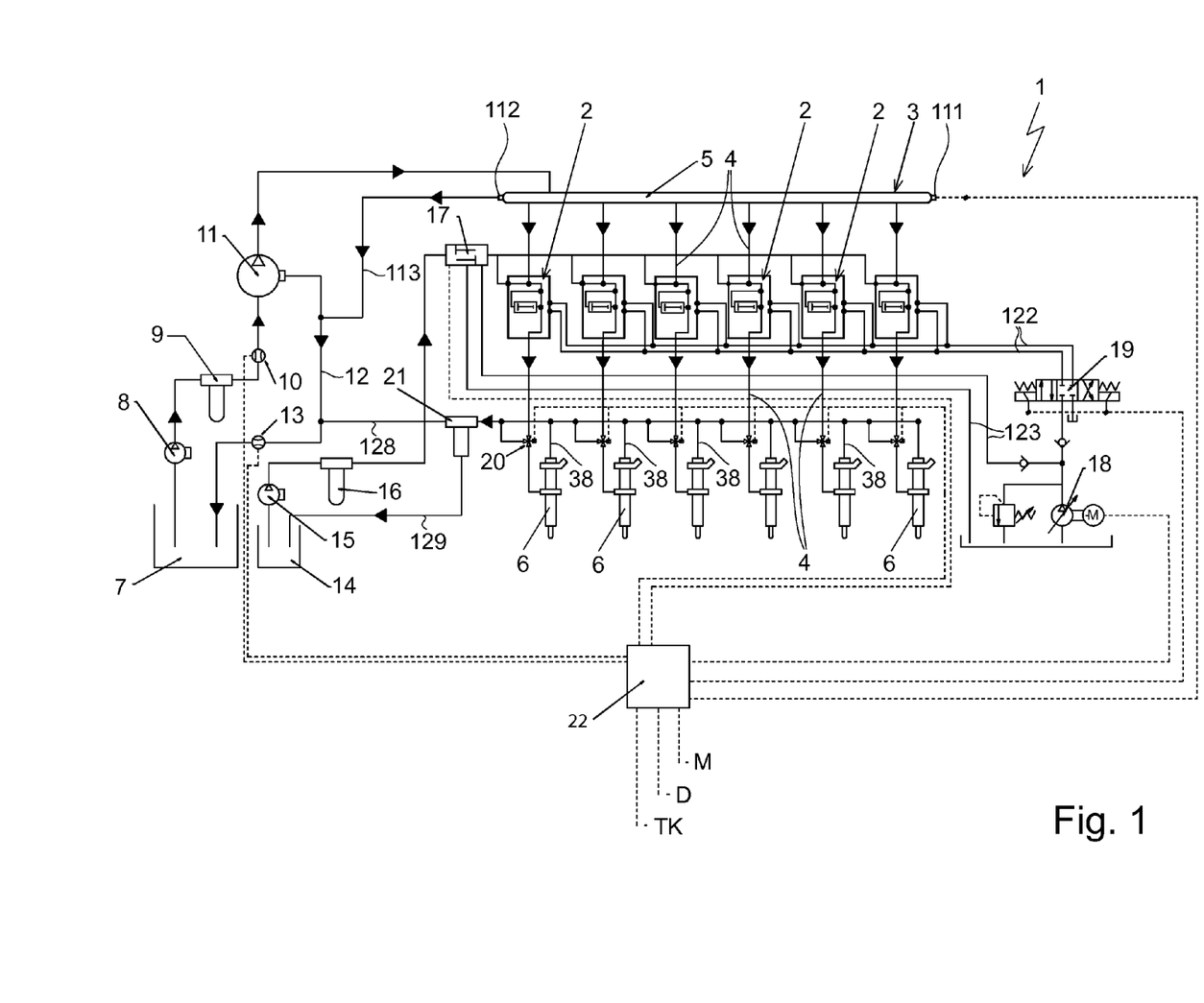
FIG. 1 shows a system diagram for a 6-cylinder engine with emulsifying devices associated with each of the individual cylinders.

In the method executed according to the invention, preferably compact mechanical high-pressure emulsifying systems arranged in the injection line between the diesel fuel high-pressure rail of a conventional common-rail diesel injection system and the respective injector are arranged as close as possible in front of the injectors in consideration of the installation conditions in today's common-rail diesel engines. By virtue of the injection line volumes minimized in this way, when the engine operating point changes, an appropriate adaptation of the water fraction in the emulsion already leads a few stroke cycles later to an injection of the appropriate emulsion (FIG. 1). The very short reaction time between the change in the emulsion composition and injection of this emulsion achieved in this way at higher engine loads is an important condition for achieving a water fraction that is metered as closely as possible to the technical combustion limit even during dynamic engine operation. In this way, the greatest possible reduction of NOx and soot emissions is achieved.

Moreover, the invention enables the emulsion to be switched to pure diesel fuel upon shutdown of the engine, so that the startup process takes place with pure diesel fuel. As a result, particularly the exhaust gas test-relevant cold start and warmup emissions are maintained at the level of the conventional diesel engine and corrosion processes in the injection system are prevented even during longer non-operation.

Particularly, a compact high-pressure emulsifying device is proposed that can be integrated into an existing common rail or rail diesel injection system in order to produce a stable water-diesel microemulsion in consideration of the smallest-possible rail volumes required for dynamic operation.

The depicted arrangement of the cylinder systems associated on a cylinder-by-cylinder basis is especially advantageous for reducing the volumes of the injection lines between emulsifying device and injector. In engines which, due to their short constructed length and more favorable injection line routing, require shorter injection line volumes between emulsifying device and injector, it is also possible in principle to reduce the number of emulsifying devices by having one emulsifying device supply two or more injectors.

The emulsifying systems are supplied with diesel fuel from the fuel rail and with the quantity of water necessary for the operating point-dependent emulsion composition, which is made available by a hydraulically driven high-pressure metering pump, via a high-pressure water distribution pipe. The water proportioning is performed on the basis of the diesel fuel consumption determined in the fuel supply and return by measurement counters, particularly volume measurement counters, by calculating the engine characteristic values of the water fractions in the emulsion deposited in an additional control device in form of an engine characteristic in consideration of the cooling water temperature and/or of the pressure in the fuel rail of the engine measured by a pressure sensor and by feeding these engine characteristic values as a control signal to the high-pressure metering pump.

Due to the fact that the heat value of the emulsion fuel decreases as the water fraction increases, the duration of the fuel injection into the combustion chamber of the engine must be extended in order to achieve performance in line with basic diesel operation. Ideally, an adaptation of the injection quantity characteristic in the injection system control device is required for this purpose. Alternatively, however, injection signals for the injectors can also be lengthened appropriately by the additional control device. However, due to the delaying of the combustion process into the expansion cycle and the degradation of the thermal engine efficiency associated therewith, there are limits to the lengthening of the duration of injection in order to adapt to the reduced heat value of the emulsion. If the lengthening of the duration of injection is not sufficient to produce the nominal output of the engine, the possibility exists in common rail-injection systems to adapt the injection quantity appropriately by increasing the pressure in the diesel rail.

Another feature of the method according to the invention consists in enabling, as a function of the engine operating state, an emulsion or a diesel operating mode, particularly a pure diesel operating mode.

The engine at normal operating temperature is generally operated with a water-diesel emulsion that is adapted to the load state. Here, the maximum possible reduction of NOx and soot emissions is sought through a water fraction in the emulsion of up to 50 percent at high engine loads and commensurately high combustion and engine temperatures. The amount of the water fraction is limited by a degradation of the thermal performance through a delayed combustion process as well as rising carbon monoxide and soot emissions. Through the fuel line volumes adapted to the short dead times between the formation of a water-diesel emulsion predetermined in form of an engine characteristic and the provision of this emulsion in the injector, a sufficiently quick adaptation of the water fraction to the momentary engine load is achieved even for dynamic engine operation.

At decreasing loads and commensurately lower combustion chamber temperatures, a reduction of the water fraction in the emulsion is necessary in order to maintain the thermodynamically favorable combustion process. For stable and low-emissions idling, this can even mean a transition to pure diesel fuel operation. In this case, water is no longer fed to the emulsifying device, for example by shutting down the metering pump, and the emulsion still present in the injection line is used up within 5 to 10 seconds.

In the starting phase of the diesel engine, a quick startup and quick warming of the engine in the first phase of warmup is only possible in the diesel fuel mode because, when using a water-diesel emulsion, a substantial degradation of the ignition characteristics occurs during a cold startup that is associated with markedly elevated emissions of uncombusted fuel. It is therefore necessary to replace the fuel emulsion contained in the emulsifying device and in the corresponding injection line sections with diesel fuel upon engine shut-down. This can be achieved by means of a flush valve arranged between emulsifying device and injector that opens a connection to the leakage return upon actuation of the engine shut-down, so that diesel fuel flowing from the diesel high-pressure rail through the emulsifying device displaces the emulsion. The opening of the flush valve is possible during the last revolutions of the crankshaft before non-operation. The duration of the opening flush valve is dimensioned such that, under the pressure conditions existing in the diesel pressure rail, the emulsion volume is flushed out completely.

In order to carry out the described method for operating a diesel engine with a water-diesel emulsion, it is necessary to integrate a device for producing the emulsion fuel into the diesel common rail or rail-injection system.

In the emulsifying device according to the invention, diesel fuel that is at the pressure level of the diesel rail and the water fraction required for an emulsion is fed to a through hole from a high-pressure metering pump and pre-mixed by a mixing pipe and/or a turbulence mixer. A portion of the existing mixture is then removed from this through hole by a hydraulically driven piston and fed again during the next delivery stroke through an emulsifying orifice or an emulsifying throttle to the passage channel and/or the main channel. The piston is loaded on both sides. During the removal stroke, this also results in the simultaneous displacement of the mixture through the emulsifying throttle.

Especially preferably, it is also possible to adapt the circulation of the emulsion volume to the emulsion quantity necessary for operating the engine by controlling the stroke frequency of the emulsifying piston. Here, too, the circulation of the emulsion volume is selected so as to be greater by a factor of 2 to 3 than the emulsion volume consumed by the engine in the same time interval.

The fuel to be emulsified is conducted in a recirculation loop that is as small as possible in terms of volume. During full-load operation, the working chamber, particularly the second pump chamber, of the emulsifying cylinder is filled with 2 to 3 times the maximum injection quantity, which is sufficient at a maximum stroke frequency of the emulsifying piston of $5_s^{-1}$ to supply the engine continuously with a fine emulsion pre-stored in the through hole or in the main channel.

In a very especially preferred embodiment of the recirculation system, a provision is made that the mixed fuel volume removed by the emulsifying piston from the main hole is selected so as to be greater by a factor of 2 to 3 than the emission quantity injected by the injector in order to thus ensure the supply of emulsion to the injector while simultaneously keeping the reaction time to changes in the emulsion compositions short. This adaptation of the stroke volume of the emulsifying cylinder can be achieved by changing the piston stroke. Accordingly, the stepped piston on the hydraulic side is provided with a travel sensor system for regulating the piston position. Another preferred embodiment of the recirculation system makes a provision that the emulsion quantity removed per unit of time from the main channel and fed in again is regulated by the stroke and/or movement frequency of the piston or emulsifying piston. At a lower engine load, for example, a smaller emulsion quantity is removed from the main channel per unit of time and fed in again by reducing the stroke and/or movement frequency of the piston. The circulating emulsion volume, i.e., the emulsion volume that is removed per unit of time from the main channel and fed in again, is selected so as to be greater by a factor of 2 to 3 than the emulsion quantity injected in the same time interval. In this way, the supply of a sufficiently good quality of emulsion to the injector is ensured.

During the high-pressure homogenization used here, the formation of a homogeneous mixture of two immiscible liquids occurs with a very quick pressure equalization, e.g., via a throttle as a result of shear stresses and cavitation. In the present configuration, a pressure difference of greater than 100 MPa is produced by the emulsifying piston. The microemulsion produced in this way has a very fine distribution of extremely small water droplets with a diameter distribution into the nm range. Emulsions with a commensurately homogeneous distribution of the water phase are advantageous for the combustion process with the greatest possible proportion of pre-mixed and thus homogeneous mixture regions with commensurately reduced NOx and soot emissions.

The high pressures in front of the emulsifying throttle required for the emulsification are produced by a stepped piston embodied as a pressure intensifier that is designed in a pressure-equalized manner with respect to the diesel rail pressure prevailing in the main bore, i.e., the pressure of the diesel fuel in the rail. The piston is driven by the hydraulic piston on the low-pressure side of the stepped piston. Due to the pressure equalization on the high-pressure side of the emulsifying piston, the force to be applied by the hydraulic piston is only needed to generate the emulsifying pressure.

The stroke movement of the emulsifying piston is controlled by the mutual loading of the hydraulic piston with a hydraulic fluid that is made available by a hydraulic unit that preferably has a variable pump. The hydraulic unit is driven directly by the engine in order to improve the overall efficiency. The stroke regulation of the emulsifying piston is performed for all emulsifying systems by appropriately controlling the manifold valve for the piston drive. The manifold valve is preferably controlled by the control device.

In order to keep the friction of the piston seals in the emulsion cylinder and the hydraulic drive output at a minimum and thus achieve the same stroke movement of the emulsifying piston, the cylinder tube is provided with a CLD coating that has very low coefficients of friction in conjunction with special mechanical seals. The mechanical seal is preferably a PTFE mechanical seal. Such a design of the emulsion cylinder has the advantage of enabling a good seal of the piston against the cylinder wall or the cylinder tube while producing little wear of the piston seals and guides.

The advantages of the method according to the invention for operating a diesel engine consist in the fact that, with the integration of the mechanical emulsifying system into a common rail or rail diesel injection system, a water-diesel emulsion with dynamically changeable water fraction can be produced in a simple and cost-effective manner. Emulsifiers are not required here, since the high-pressure emulsification performed in a loop or recirculation process using an emulsifying orifice at emulsification pressures of over 100 MPa results in a sufficiently stable microemulsion. The quantity of the emulsified fuel is determined according to the emulsion consumption through the adaptation of the stroke volume of the emulsifying cylinder and/or by the stroke frequency of the pump plunger in the emulsifying device. Accordingly, this results in an advantageous adaptation of the energy required for the emulsification process to the actual fuel consumption.

Another advantage of the proposed method is the possibility of providing operation with water-free diesel fuel by simply interrupting the water proportioning in critical engine operating states, such as low idle and the warm-up phase after a cold start. In addition to the interruption of the water proportioning, the emulsifying piston movement can advantageously be switched off. By switching off the emulsifying piston movement, fuel no longer flows through the first and the second pump chamber or the branch channel from the main channel to the first pump chamber and the connection channel between the two pump chambers. This leads to an acceleration of the reduction of the water fraction in the diesel fuel.

The diesel fuel operation required for the cold starting process without increased emissions of uncombusted hydrocarbons compared to basic diesel operation is achieved through an exchange occurring during the preceding shutdown process of emulsion fuel still present in the line system and in the emulsifying device by means of a flushing device. The flushed-out emulsion is returned via the leakage system with subsequent water-diesel separation in a water separator into the diesel and the water tank. An additional emulsion intermediate rail is therefore not necessary.

The method according to the invention and the emulsifying device according to the invention can be used not only in common rail or rail injection systems but also in conventional pump-line-nozzle systems. Pump-line-nozzle systems are understood below as also including pump nozzle systems in which pump and nozzle are accommodated in a common housing.

In this kind of pump-line-nozzle system (hereinafter also PLD system), it is advantageous to integrate the emulsifying system into the low-pressure supply loop of the injection pump.

The possibility of quickly changing the water concentration in the water-diesel emulsion remains at least mostly intact. The pure diesel operation that is advantageous for the shutdown and startup processes can be achieved by means of flushing processes in the low-pressure area of the system.

Diesel engines that are equipped with an emulsifying device according to the invention and/or emulsifying devices according to the invention can also be operated with other emulsion fuels. Diesel fuel, biodiesel and/or synthetic diesel fuel can be contained in the emulsion fuel. Another component that is not miscible with the aforementioned component(s) can then be contained in the emulsion fuel as another component of the emulsion fuel. The other component can preferably be water or water-alcohol mixtures.

Preferably, the water fraction in the water-diesel emulsion is regulated by a control device. This is preferably an additional control device for controlling the emulsifying device. The regulation is preferably performed as a function of the engine load, the engine speed and/or the cooling water temperature. Moreover, alternatively or in addition to the regulation of the water fraction in the water-diesel emulsion, the replacement of the water-in-diesel fuel emulsion with diesel fuel, for example as a flushing process during engine shut-down, can be regulated by the control device.

EXEMPLARY EMBODIMENT

The invention is explained below in exemplary fashion on the basis of the drawing.

In the figures, same or similar components are designated by the same reference symbols, with corresponding characteristics and advantages arising even if a repeated description is omitted for the sake of simplicity.

FIG. 1 shows a schematic representation of a proposed diesel engine 1 with particularly several proposed emulsifying devices 2, which are preferably integrated into an injection system 3 of the diesel engine 1 or associated therewith.

In particular, the emulsifying devices 2 are particularly arranged in or integrated into high-pressure or injection lines 4 between a diesel rail or collection bar 5 and injector nozzles, injection valves or injectors 6. The proposed diesel engine 1 can be operated with a water-diesel emulsion with variable composition up to diesel fuel.

The engine 1 and/or the injection system 3 preferably has a diesel tank 7, a diesel booster pump 8, a diesel filter 9, a fuel counter 10, particularly a fuel volume counter, and/or a diesel high-pressure pump 11 in the feed line to the collection bar 5. The diesel high-pressure pump 11 and/or the collection bar 5 can preferably have a high pressure control 112 and/or a fuel return 113 to the diesel tank 7. Advantageously, a pressure sensor 111 is integrated into the diesel rail that supplies measurement signals for the current diesel fuel pressure in the rail to the control device 22.

A leakage or return line 12 leads from the collection bar 5 and/or from the diesel high-pressure pump 1 via a fuel counter 13 back to the diesel tank 7.

The emulsifying devices 2 can each preferably be supplied with fuel, particularly diesel fuel, and a component to be mixed in, in this case water.

In the depicted example, the engine 1 and/or the injection system 3 preferably has a water tank 14, a water booster pump 15, a water filter 16 and/or a metering unit 17, particularly metering pump and/or high-pressure pump, for supplying or feeding water to the metering devices 2.

The engine 1 and/or the injection system 3 and/or the respective emulsifying device 2 and/or the metering unit 17 preferably has a hydraulic drive, particularly with a variable pump 18 and/or a valve 19, particularly for loading or supplying water or another hydraulic fluid under variable and/or adjustable pressure.

Especially preferably, the emulsifying devices are supplied in parallel with water and/or are connected in parallel to the metering unit 17.

In the depicted example, a separate or distinct emulsifying device 2 is preferably associated with each cylinder and/or each injector 6. However, several injection valves and/or injectors 6 can also be connected to a common emulsifying device 2, as will be explained later in further detail in relation to another design variant according to FIG. 2.

The engine 1 and/or injection system 3 preferably has flush valves 20 respectively associated with the emulsifying devices 2 and particularly respectively arranged in the injection lines 4 between the associated emulsifying device 2 and the respective injector 6.

The flush valves 20 and/or the leak lines 38 of the injectors 6 are preferably connected to a water separator 21. When the flush valves 20 are open, the emulsifying devices 2 and injection lines 4 can be flushed with diesel fuel, residual quantities of diesel fuel and water being discharged via the water separator 21 and separated into diesel fuel and water. The separated diesel fuel is fed back via the return line 12 into the diesel tank 7. The separated water is fed back via a corresponding return line into the water tank 14.

The engine 1 preferably has a control device 22, preferably for the emulsion operation, that controls or regulates the water fraction particularly as a function of operating parameters and/or the engine operating point, especially preferably as a function of engine load M, engine speed D and/or cooling water temperature K, the water fraction being mixed with the diesel fuel by means of the emulsifying devices 2.

In particular, the water fraction of the water-in-diesel fuel emulsion made available by the respective emulsifying device 2 is thus changed or varied or adapted as a function of the engine operating point.

FIG. 1 shows the corresponding preferred and/or optional signal connections, control lines and the like of the control device 22 with the corresponding components in broken lines.

The emulsifying devices 2 preferably operate mechanically.

Figure 2:
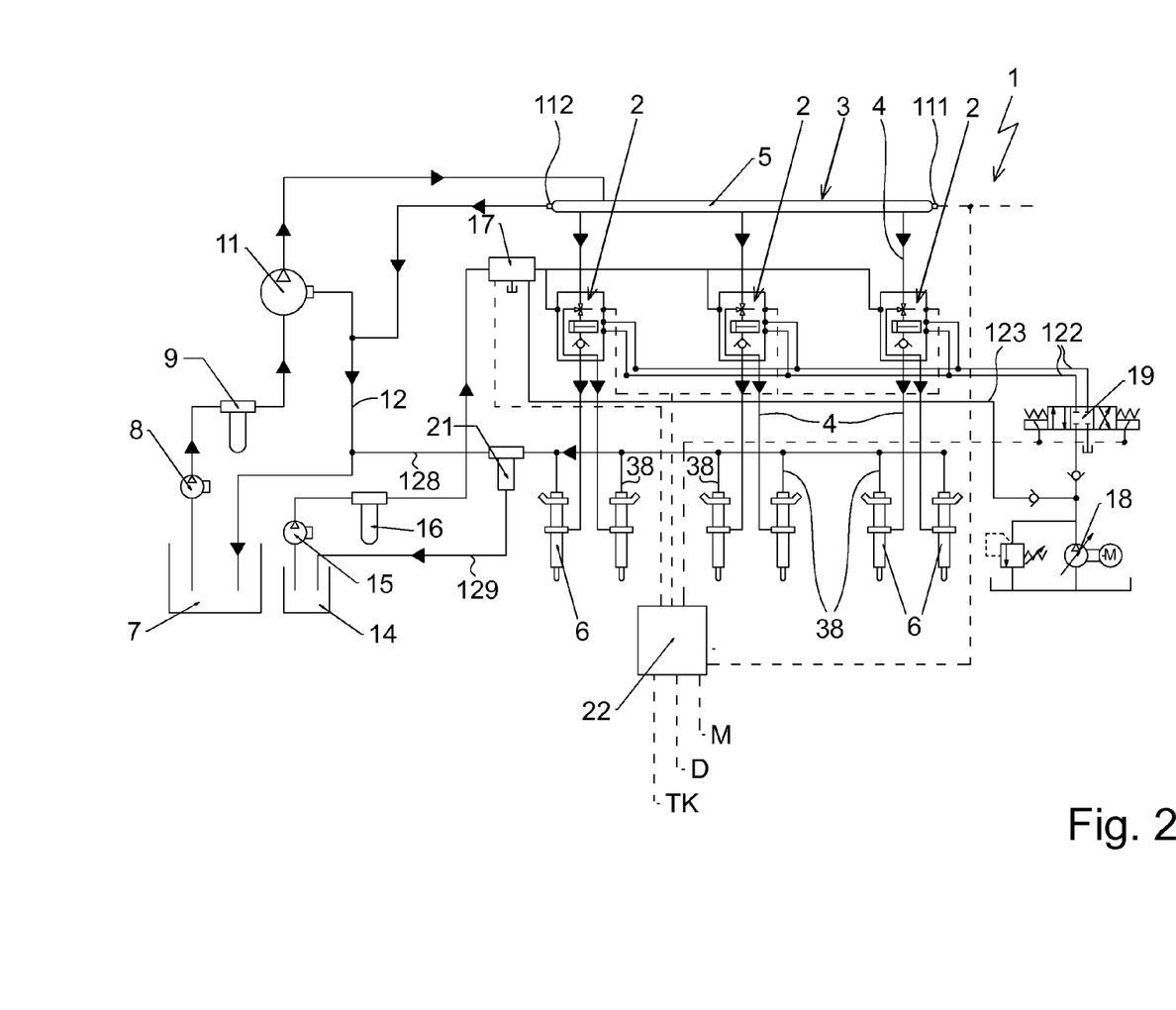
FIG. 2 shows a system diagram for a 6-cylinder engine with emulsifying devices each associated with two cylinders.

In a similar illustration, FIG. 2 shows the diesel engine 1 according to another design variant, the injectors 6 being connected in pairs to a common emulsifying device 2. Otherwise, the remarks and explanations in relation to the embodiment according to FIG. 1 apply correspondingly or additionally.

Figure 3:
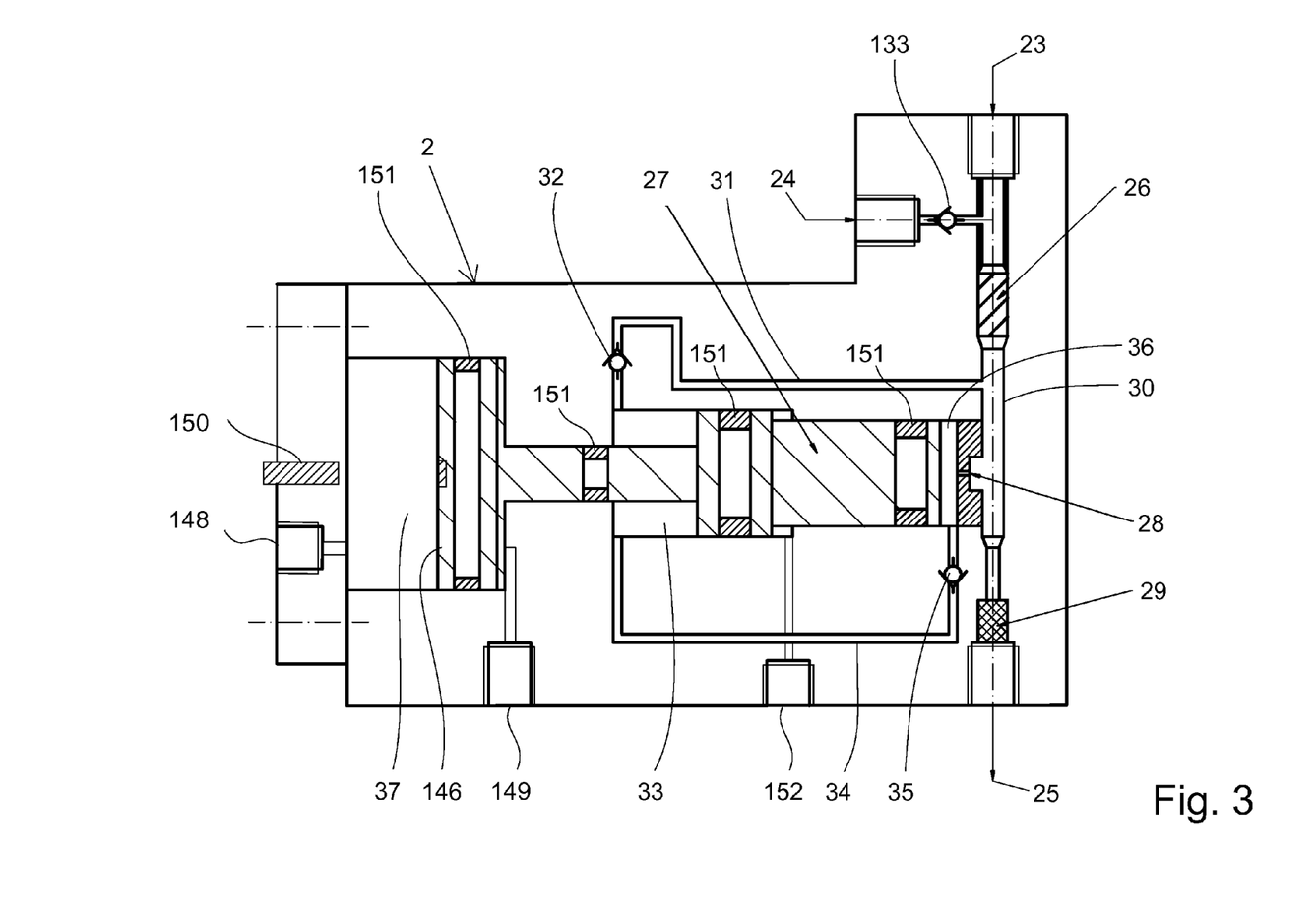
FIG. 3 shows a schematic representation of an emulsifying device according to the invention.

FIG. 3 shows a schematic sectional representation of a preferred construction of the proposed emulsifying device 2.

The emulsifying device 2 preferably has an inlet 23 for diesel fuel and an inlet 24 for water as well as an outlet 25 for the water-in-diesel fuel emulsion.

The emulsifying device 2 preferably has a mechanical pre-emulsifier 26. However, this is provided only optionally. The pre-emulsifier is preferably a turbulence mixer.

The emulsifying device 2 preferably has a mixing device, particularly a particularly hydraulically driven or movable piston 27 and/or an emulsifying throttle 28 for mechanical emulsification.

The emulsifying device 2 optionally has a damper 29 in front of the outlet 25. Pressure oscillations in front of the injector that can be brought about by the piston 27 are reduced by the damper 29.

The emulsifying device 2 has a main channel 30 through which the diesel fuel and the water, fed in via the inlets 23 and 24, flows to the outlet 25 via the optional pre-emulsifier 26 and the optional damper 29.

The piston 27 and the associated emulsifying throttle 28 form a mechanical mixing device for mixing water and diesel fuel. This mixing device is particularly connected to the channel 30, especially preferably between the pre-emulsifier 26 and the damper 29.

The mixing device preferably operates mechanically and is particularly hydraulically driven.

In particular, the piston 27 forms a piston pump that allows to flow through or pumps the water and the diesel fuel for mixing by the emulsifying throttle 28—particularly an opening with a small cross section of preferably about 0.2 mm. Preferably, the emulsifying throttle 28 has a throttle bore with a diameter of 0.15 mm to 0.25 mm. Preferably, the differential pressure at the throttle is at least 100 MPa.

Preferably, the emulsifying device 2 and/or mixing device has a branch channel 31, a non-return valve 32 arranged in the branch channel 31, a first pump chamber 33, a connection channel 34, a non-return valve 35 arranged in the connection channel 34 and/or a second pump chamber 36.

The branch channel 31 branches off from the main channel 30 and connects the main channel 30 to the first pump chamber 33.

The connection channel 34 connects the first pump chamber 33 to the second pump chamber 36.

The piston 27, which is preferably embodied as a stepped piston, is embodied such that it can be moved back and forth by an appropriate drive, here preferably a hydraulic drive, particularly through commensurate charging in a working cylinder 37, whereby the piston 27 alternatingly increases and reduces the size of the two working chambers 33 and 36 in order to divert the diesel fuel and the water via the branch channel 31 from the main channel 30 and finally pump them through the emulsifying throttle 28 back into the main channel 30. In this way, a loop system is formed in which the mixture volume removed through the branch channel 31 per unit of time exactly matches the emulsion volume fed in again during the same time unit via the emulsifying throttle 28 to the main channel 30.

Preferably, the working cylinder 37 is appropriately charged by the variable pump 18 with a pressurized hydraulic fluid, such as hydraulic oil or water, in order to carry out the desired driving of the piston 27. However, other structural solutions are also possible.

The water fraction of the water-in-diesel fuel emulsion discharged from the emulsifying device 2 depends particularly on the quantity of water that is fed in via the inlet 24. This water fraction is determined by the metering pump or metering unit 17. This is preferably also hydraulically driven and/or is preferably controlled by the control device 22.

The frequency of movement of the piston 27 is preferably monitored with the control device 22. Preferably, a piston travel measuring system 150 is also provided. By measuring the frequency of the movement of the piston 27 and/or of the piston stroke, it is possible to monitor and/or control the emulsion volume introduced via the emulsifying throttle 28 into the main channel 30.

Advantageously, it can be ensured through the controlling and/or monitoring of the frequency of the piston 27 and/or of the piston stroke of the piston 27 that no emulsion is able to leave the pump chambers 33 and 36 and the channels 31 and 34 and gets into the main channel 30 and thus to the injector 6 during flushing of the main channel 30 and/or of the injection line 4 leading to the injector. This advantageous monitoring and controlling of the piston 27 during main channel 30 flushing processes is particularly advantageous during engine shut-down and/or during engine startup.

Advantageously, the cylinder contact surfaces of the emulsifying piston 27 are provided with a CLD coating. Alternatively or in addition, it is advantageous if the piston has 27 PTFE mechanical seals 151. This makes low coefficients of friction possible with simultaneously high tightness. Advantageously, a return channel 152 is provided through which quantities of emulsion leakage, i.e., emulsion quantities that have penetrated through the mechanical seals 151, can be discharged from the emulsifying device 2. Advantageously, these quantities of emulsion leakage are fed to the water separator 21. It is particularly advantageous in this respect to feed the quantities of emulsion leakage to the water separator 21 via a leak line.

Another embodiment of the proposed method and of the proposed emulsifying device and the proposed diesel engine is explained below in further detail on the basis of the other figures, the previous remarks and explanations applying particularly analogously or in addition, even if this is not explicitly repeated. Moreover, individual features and aspects of the various embodiments can also be combined as desired and with each other or also be implemented individually of each other.

Figure 4:
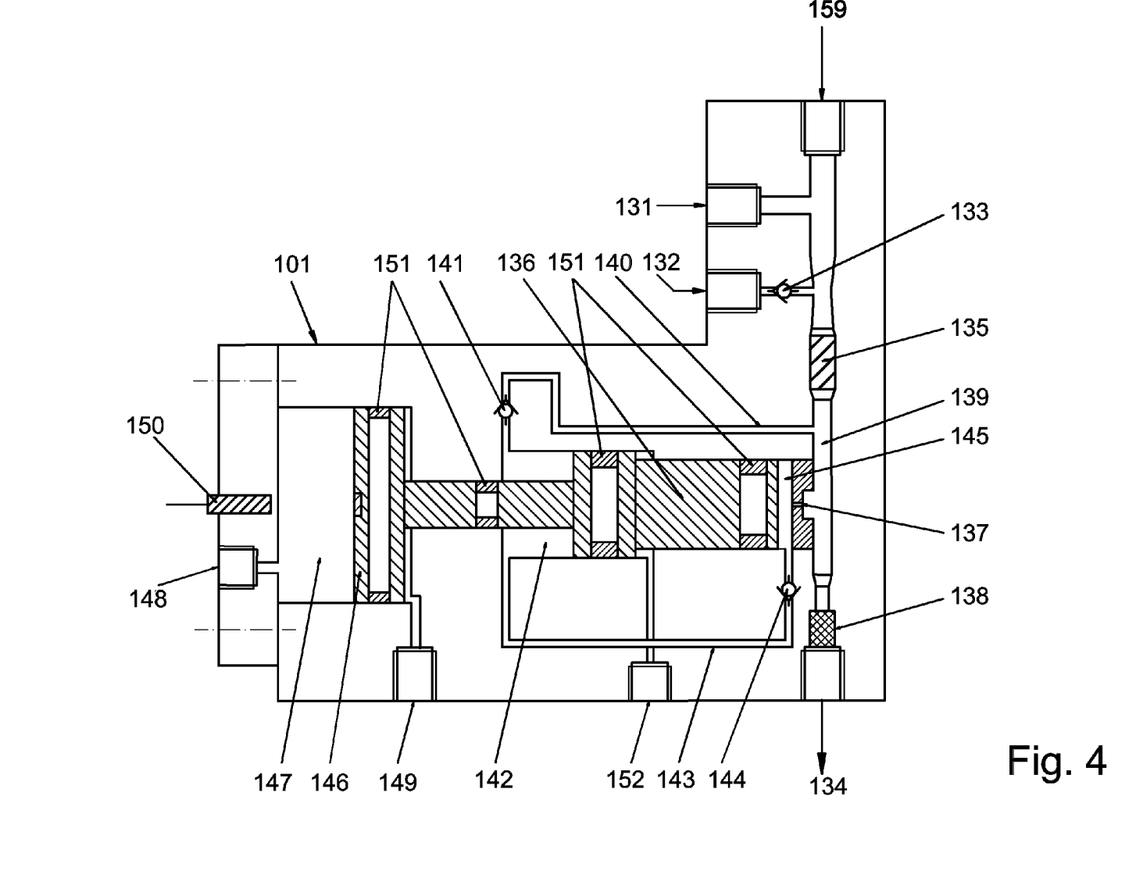
FIG. 4 shows a schematic representation of another emulsifying device according to the invention for injection systems according to the pump-line-nozzle principle.

FIG. 4 shows another emulsifying device 101 according to the invention. This has a piston 136. The frequency of movement of the piston 136 is preferably monitored with the control device 130. Preferably, a piston travel measuring system 150 is also provided. By measuring the frequency of the movement of the piston 136 and/or of the piston stroke, it is possible to monitor and/or to control the emulsion volume introduced via the emulsifying throttle 137 into the main channel 139.

Advantageously, it can be ensured through the controlling and/or monitoring of the frequency of the piston 136 and/or of the piston stroke of the piston 136 that no emulsion can leave the pump chambers 142 and 145 and the channels 140 and 143 and gets into the main channel 139 and hence to the injector 104 during flushing of the main channel 139 and/or of the injection line 127 leading to the injector. This advantageous monitoring and controlling of the piston 136 during the flushing of the main channel 139 is particularly advantageous during engine shut-down and/or engine startup.

Advantageously, the cylinder contact surfaces of the emulsifying piston 136 are provided with a CLD coating. Alternatively or in addition, it is advantageous if the piston 136 has PTFE mechanical seals 151. This makes low coefficients of friction possible with simultaneously high tightness. Advantageously, a return channel 152 is provided through which quantities of emulsion leakage, i.e., emulsion quantities that have penetrated through the mechanical seals 151, can be discharged from the emulsifying device 101. Advantageously, these quantities of emulsion leakage are fed to the water separator 126. It is particularly advantageous in this respect to feed the quantities of emulsion leakage to the water separator 126 via a leak line 125 (for the interconnection of leak line 125 and water separator 126, see FIG. 5).

The emulsifying device 101 shown in FIG. 4 is particularly suitable for use in diesel injection systems with cam-driven pump elements. This is shown schematically for the pump 157 in FIG. 5. The pump 157 supplies the injector and/or the injector nozzle 104. The pump 147 is supplied via the circulation line 155 with fuel and/or emulsion fuel. The circulation line 155 has a supply pressure regulator 158. In the circulation line 155, the fuel and/or the emulsion fuel is conveyed by the circulating pump 154.

Figure 5:
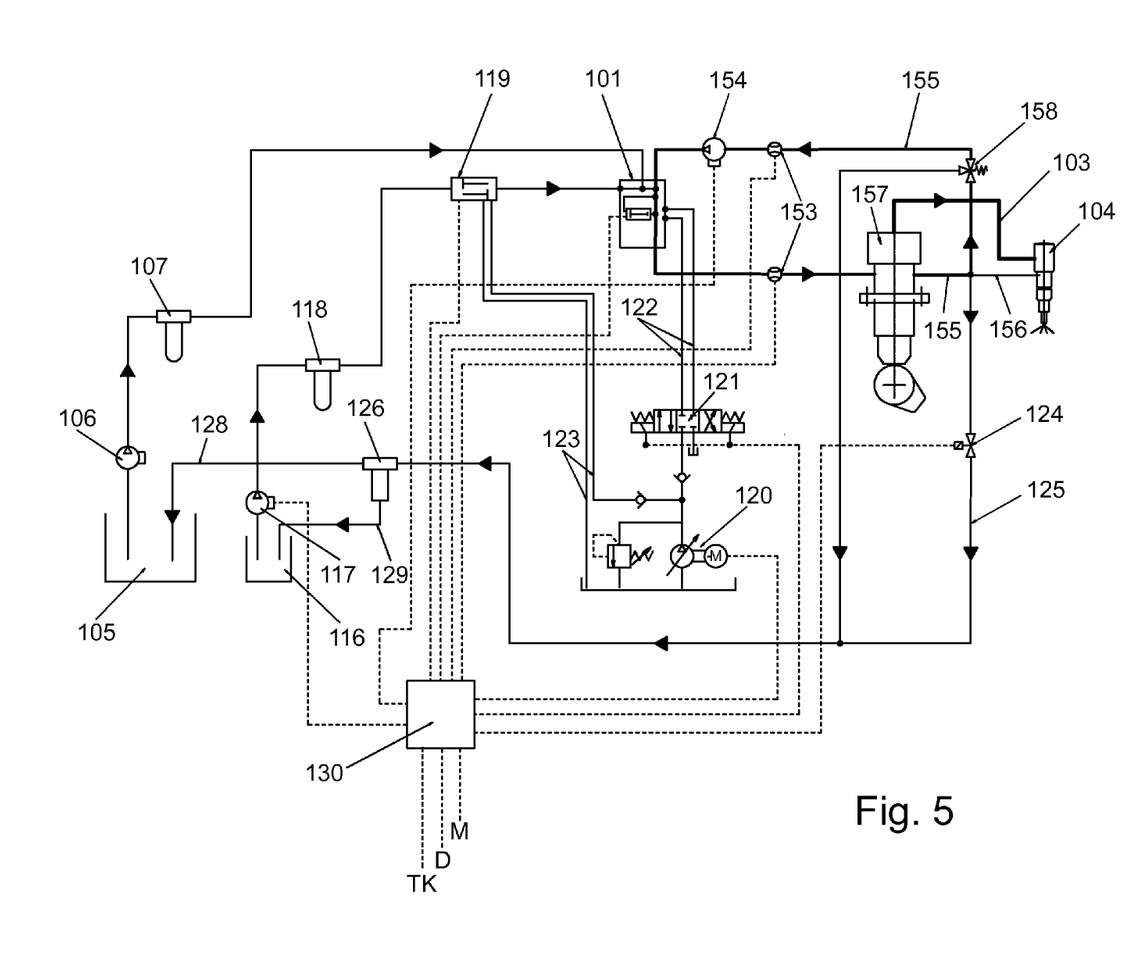
FIG. 5 shows a system diagram for an injection system according to the pump-line-nozzle principle.

Moreover, the circulation line 155 has sensors 153 for monitoring the water content of the emulsion fuel. The sensors 153 are also used to control the flush valve 124. By opening the flush valve 124, the emulsifying device 101 and/or the circulation line 155 can be flushed with diesel fuel. This occurs particularly during shut-down and/or startup of the diesel engine. The emulsion fuel accumulating during this kind of flushing process and/or the balancing quantity of the fuel accumulating in the supply pressure regulator 158 and/or the leakage quantity of the injector 104 can be fed via the leak line 125 to the water separator 126. The water separator 126 is used to separate diesel fuel and water. The water separated from the diesel fuel is fed through the water return line 129 for water to the water tank 116. The diesel fuel separated from the water is fed via the diesel return line 128 for diesel to the diesel tank 105.

To enable integration into the circulation line 155, the emulsifying device shown schematically in FIG. 4 has an additional inlet 159. This additional inlet 159 is connected to the circulation line 155. The outlet 134 of the emulsifying device 101 is also connected to the circulation line 55. As a result, the main channel 139 of the emulsifying device 101 is made part of the loop formed by the circulation line 155. The emulsifying device 101 also has an inlet 131 for letting diesel fuel in and an inlet 132 for letting water in. The quantities and/or quantity flows fed through the inlets 131 and/or 132 can preferably be controlled by the control device 130, particularly in a characteristic-based manner. Preferably, the inlet 132 for letting water in has a non-return valve 133 that prevents water backflow.

What are proposed are a method and an emulsifying device for operating a diesel engine with a water-in-diesel fuel emulsion, with the water fraction being changed as a function of the engine operating point and/or the emulsifying device and/or parts of the injection line being flushed with pure diesel fuel during engine shut-down.

LIST OF REFERENCE SYMBOLS

| | |
|---|---|
| 1 | diesel engine |
| 2 | emulsifying device |
| 3 | injection system |
| 4 | injection line |
| 5 | collection bar or rail |
| 6 | injector |
| 7 | diesel tank |
| 8 | diesel booster pump |
| 9 | diesel filter |
| 10 | fuel counter (feed line) |
| 11 | diesel high-pressure pump |
| 12 | return line |
| 13 | fuel counter (return line) |
| 14 | water tank |
| 15 | water booster pump |
| 16 | water filter |
| 17 | metering unit (water) |
| 18 | variable pump |
| 19 | valve |
| 20 | flush valve |
| 21 | water separator |
| 22 | control device |
| 23 | inlet (diesel fuel) |
| 24 | inlet (water) |
| 25 | outlet |
| 26 | pre-emulsifier |
| 27 | piston |
| 28 | emulsifying throttle |
| 29 | damper |
| 30 | main channel |
| 31 | branch channel |
| 32 | non-return valve |
| 33 | first pump chamber |
| 34 | connection channel |
| 35 | non-return valve |
| 36 | second pump chamber |
| 37 | working chamber or cylinder |
| 38 | leak line |
| 101 | emulsifying device |
| 103 | injection line |
| 104 | injector |
| 105 | diesel tank |
| 106 | diesel booster pump |
| 107 | diesel filter |
| 108 | diesel volume counter (feed line) |
| 111 | pressure sensor |
| 112 | high pressure control |
| 113 | fuel return |
| 116 | water tank |
| 117 | water booster pump |
| 118 | water filter |
| 119 | metering unit (water) |
| 120 | variable pump |
| 121 | valve |
| 122 | hydraulic system (emulsifying units) |
| 123 | hydraulic system (metering unit) |
| 124 | flush valve |
| 125 | leak line |
| 126 | water separator |
| 128 | diesel return line |
| 129 | water return line |
| 130 | control device |
| 131 | inlet (diesel fuel) |
| 132 | inlet (water) |
| 133 | non-return valve (water supply) |
| 134 | outlet |
| 135 | pre-emulsifier |
| 136 | piston |
| 137 | emulsifying throttle |
| 138 | damper |
| 139 | main channel |
| 140 | branch channel |
| 141 | non-return valve |
| 142 | first pump chamber |
| 143 | connection channel |
| 144 | non-return valve |
| 145 | second pump chamber |
| 146 | hydraulic piston |
| 147 | working chamber |
| 148 | connection channel (hydraulic system) |
| 149 | connection channel (hydraulic system) |
| 150 | piston position sensor |
| 151 | mechanical seals |
| 152 | return channel |
| 153 | sensors |
| 154 | pump (circulation line) |
| 155 | circulation line |
| 156 | leak line |
| 157 | pump |
| 158 | supply pressure regulator |
| 159 | inlet |
| D | engine speed |
| TK | cooling water temperature |
| M | engine load |

The invention claimed is:

1. A method for operating a diesel engine with a water-in-diesel fuel emulsion,
wherein diesel fuel and water are fed to a main channel and pre-mixed by flow mechanics, wherein a water-diesel mixture is sucked out of this main channel into a first pump chamber and simultaneously conveyed back into the main channel, through an emulsifying orifice or throttle.

2. The method according to claim 1, wherein diesel and water are mixed proximate to an injector or injection valve or an injector nozzle, in a high-pressure part of an injection system, to improve or minimize reaction times between a change in the water fraction in the emulsion and the provision thereof at the injector and/or at the injector nozzle.

3. The method according to claim 1, wherein water-in-diesel fuel emulsion present upon shut-down of the diesel engine during last revolutions of a crankshaft in an emulsifying device and/or an injection line to an injector or injection valve and/or an injector nozzle, the injection line between the emulsifying device and an injector, is replaced by subsequently flowing diesel fuel as a result of the opening of a flush valve.

4. The method according to claim 1, wherein fuel leakages that occur as a result of leaks at injectors or injection valves and/or injector nozzles and/or emulsion fuel that must be discharged during the flushing of an emulsifying device and a corresponding injection lines are conducted into a leak line.

5. The method according to claim 1, wherein, in larger and/or multi-cylinder diesel engines, the water-in-diesel fuel emulsion is produced by means of a plurality of emulsifying devices, one emulsifying device of the plurality of emulsifying devices being positioned in front of each injector or injection valve and/or each injector nozzle.

6. The method according to claim 1, wherein the water fraction in the water-diesel emulsion is regulated by an additional control device, as a function of the composition of the water-diesel emulsion present in a circulation line, the engine load, engine speed and/or the cooling water temperature.

7. The method according to claim 1, wherein the water-diesel mixture is conveyed back into the main channel, through an emulsifying orifice or throttle, from a second pump chamber.

8. A method for operating a diesel engine with a water-in-diesel fuel emulsion, wherein the water fraction of the water-in-diesel-fuel emulsion is changed or adapted as a function of an engine operating point, wherein water-in-diesel fuel emulsion present upon shut-down of the diesel engine during last revolutions of a crankshaft in an emulsifying device and an injection line to an injector is replaced by subsequently flowing diesel fuel.

9. The method according to claim 8, wherein diesel fuel and water are fed to a main channel for mixing in a proportion described by the operating point and/or are pre-mixed by flow mechanics.

10. The method for according to claim 1, wherein diesel fuel and water are fed to the main channel for mixing in a proportion described by an operating point.

11. The method according to claim 1, wherein diesel fuel and water are fed to the main channel at a variable pressure described by a diesel fuel rail.

12. The method according to claim 1, wherein the water-diesel mixture is sucked out of the main channel into the first pump chamber by a hydraulically driven piston.

13. The method according to claim 7, wherein, in a first working cycle, water-diesel emulsion is sucked into the first pump chamber and conveyed from a second pump chamber into the main channel and, in a second working cycle, water-diesel emulsion is conveyed from the first pump chamber into the second pump chamber.

14. The method according to claim 4, wherein the leakage is separated by means of water separators into anhydrous diesel fuel and water and is fed back into corresponding supply tanks.

15. The method according to claim 5, wherein a fuel line volume between emulsifying device and injector or injection valve and/or injector nozzle is less than half of the maximum injection quantity per working cycle.

16. The method according to claim 1, wherein a replacement of the water-diesel emulsion with diesel fuel is regulated by an additional control device.

17. The method according to claim 1, wherein the cycle frequency of an emulsifying device is regulated as a function of the injected quantity of water-diesel emulsion, with the water-diesel fuel-emulsion volume conveyed through the emulsifying throttle per unit of time being at least two times and/or no more than three times the water-diesel fuel-emulsion volume injected in the same time unit.

18. The method according to claim 1, wherein a pressure of at least 100 MPa is present at the emulsifying throttle in order to emulsify the water-fuel mixture.

19. The method according to claim 13, wherein a backflow of the water-diesel emulsion from the second pump chamber into the first pump chamber is prevented by means of a non-return valve and/or a backflow of the water-diesel emulsion from the first pump chamber into the main channel is prevented by means of a non-return valve.

20. The method according to claim 13, wherein a mechanical coupling between the first pump chamber and the second pump chamber is provided, via a piston, such that the sum of the volumes of the first pump chamber and of the second pump chamber always remains constant during operation.

21. The method according to claim 12, wherein the piston is provided with mechanical seals made of PTFE and/or wherein the cylinder contact surfaces interacting with the piston are provided with a CLD coating.

22. The method according to claim 8, wherein, when the engine operating point changes, an appropriate adaptation of the water fraction in the emulsion already leads a few stroke cycles of the diesel engine later to an injection of the appropriate emulsion.

23. The method according to claim 8, wherein an emulsion operating mode or a pure diesel operation mode is enabled as a function of the engine operating state.

24. The method according to claim 8, wherein diesel and water are mixed proximate to an injector or injection valve or an injector nozzle, in the high-pressure part of an injection system, to improve or minimize reaction times between the change in the water fraction in the emulsion and the provision thereof at the injector and/or at the injector nozzle.

25. The method according to claim 8, wherein water-in-diesel fuel emulsion present upon shut-down of the diesel engine during last revolutions of a crankshaft in an emulsifying device and/or an injection line, the injection line between the emulsifying device and an injector, to an injector or injection valve and/or an injector nozzle, is replaced by subsequently flowing diesel fuel as a result of the opening of a flush valve.

26. The method according to claim 8, wherein the water fraction in the water-diesel emulsion is regulated by an additional control device, as a function of the composition of the water-diesel emulsion present in a circulation line, the engine load, engine speed-and/or the cooling water temperature.

* * * * *